United States Patent [19]

Sasaki

[11] Patent Number: 5,915,548

[45] Date of Patent: Jun. 29, 1999

[54] CASING FOR ACCOMMODATING RECORDING MEDIUMS IN COMPARTMENTS

[75] Inventor: Jun Sasaki, Miyagi, Japan

[73] Assignee: Sony Corporation, Japan

[21] Appl. No.: 09/100,867

[22] Filed: Jun. 22, 1998

[30] Foreign Application Priority Data

Jun. 20, 1997 [JP] Japan ................................. 9-163629

[51] Int. Cl.[6] ............................ B65D 85/575; B65D 1/24
[52] U.S. Cl. .................................... 206/307.1; 206/308.1; 206/387.13; 206/472; 220/522
[58] Field of Search ........................ D6/631; 206/307.1, 206/308.1, 387.13, 387.14, 472; 220/521–524

[56] References Cited

U.S. PATENT DOCUMENTS

| | | | |
|---|---|---|---|
| D. 225,388 | 12/1972 | Price | D6/631 |
| D. 226,146 | 1/1973 | Price | D6/631 |
| D. 280,951 | 10/1985 | Holland | D6/631 |
| 3,640,379 | 2/1972 | Weingarden | 206/387.13 |
| 3,743,081 | 7/1973 | Roberg et al. | 206/387.13 |
| 4,002,355 | 1/1977 | Sendor | 206/307.1 X |
| 4,255,872 | 3/1981 | Williams, Sr. | 206/307.1 X |
| 4,341,307 | 7/1982 | Shyers | 206/387.13 X |
| 4,470,488 | 9/1984 | Broussard | 220/522 X |
| 4,593,814 | 6/1986 | Hagiwara et al. | 206/387.13 X |
| 5,775,500 | 7/1998 | Williams | 206/387.13 X |
| 5,839,575 | 11/1998 | Blanco | 206/307.1 X |

FOREIGN PATENT DOCUMENTS

2003118  3/1979  United Kingdom .............. 206/387.13

*Primary Examiner*—Bryon P. Gehman
*Attorney, Agent, or Firm*—Rader, Fishman & Grauer; Ronald P. Kananen

[57] ABSTRACT

A casing for accommodating recording mediums with different sizes and thicknesses includes a main body formed with an opening, a lid rotatably mounted to the main body and for closing the opening of the main body, and compartments for receiving the recording mediums. The compartments are arranged with the main body and the lid.

15 Claims, 9 Drawing Sheets

CASING FOR ACCOMMODATING RECORDING MEDIUMS IN COMPARTMENTS

BACKGROUND OF THE INVENTION

The present invention relates to casings for accommodating recording mediums such as a videotape cassette and an audiotape cassette.

Figure 11:
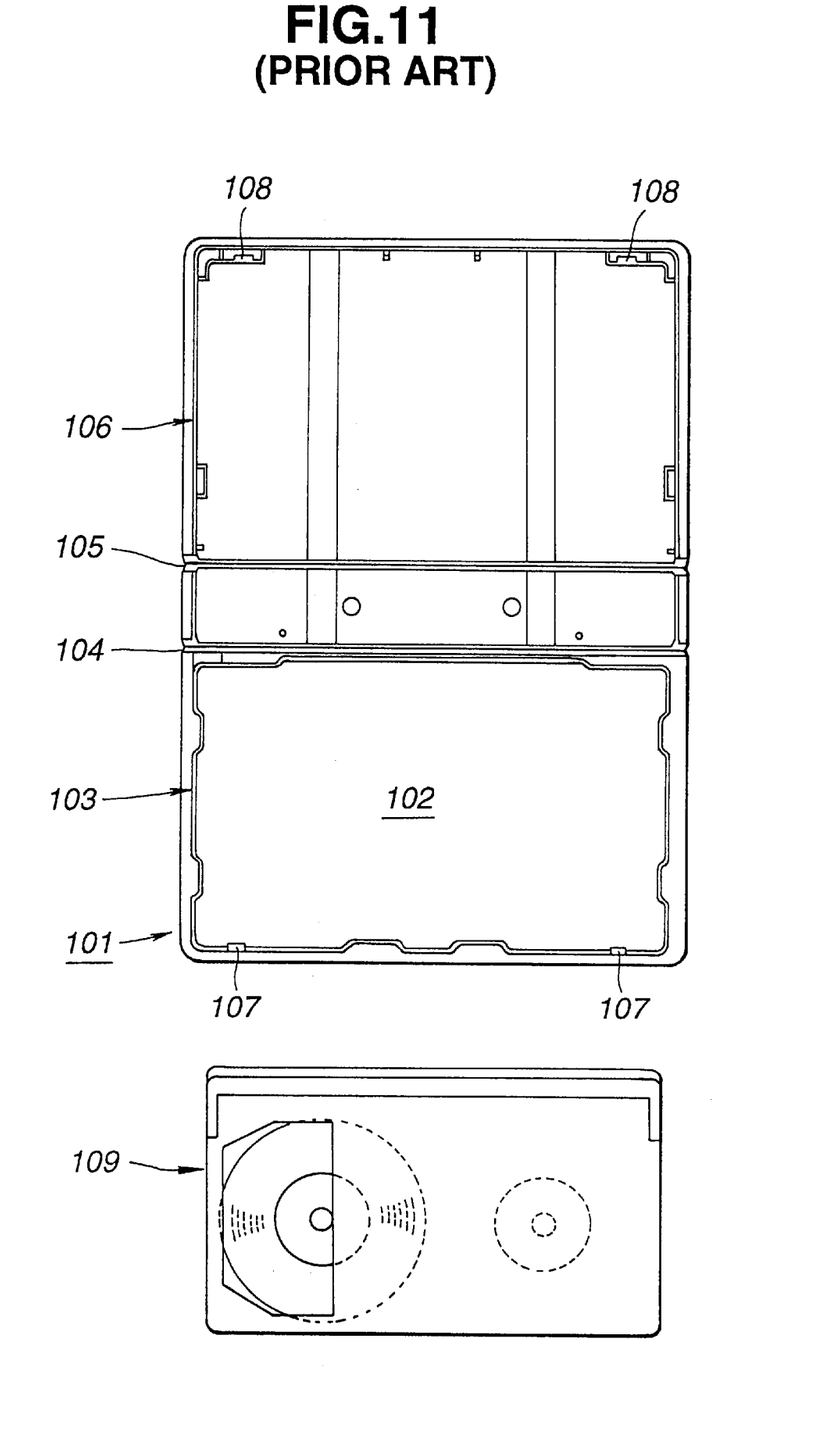
FIG. 11 is a view similar to FIG. 10, showing a known casing.

FIG. 11 shows a known casing for accommodating recording mediums such as a tape cassette. This cassette casing 101 comprises a main body 103 having a cassette compartment 102 for accommodating a recording medium or videotape cassette 109, and a lid 106 rotatably mounted to one end of the main body 103 through first and second hinges 104, 105 to close an opening thereof.

When accommodating the videotape cassette 109 in the cassette compartment 102, and rotating the lid 106 at right angles through the first and second hinges 104, 105 to be placed on the casing main body 103, male engagements 108 of the lid 106 are meshed with female engagements 107 of the casing main body 103, obtaining the lid 106 locked with the casing main body 103.

The known cassette casing 101 could not accommodate only one videotape cassette, however.

When producing a new tape cassette by combining a videotape cassette with image information with an audiotape cassette with audio information by editing, or putting multilingual narration to one image, it is necessary to prepare one image videotape cassette, narration audiotape cassettes, and one editing tape cassette.

In view of the fact that various tape cassettes such as a videotape cassette and an audiotape cassette are needed for producing one edited tape cassette, keeping of those tape cassettes in separate cassette casings makes their take-in and takeout inconvenient.

It is, therefore, an object of the present invention to provide cassette casings which enable easy take-in and takeout of tape cassettes.

SUMMARY OF THE INVENTION

One aspect of the present invention lies in providing a casing for accommodating recording mediums with different sizes and thicknesses, comprising:
a main body formed with an opening, said main body having a peripheral wall;
a lid rotatably mounted to said main body, said lid closing said opening of said main body, said lid having a peripheral wall; and
compartments for receiving the recording mediums.

Another aspect of the present invention lies in providing a casing for accommodating recording mediums with different sizes and thicknesses, comprising:
a main body formed with an opening, said main body having a peripheral wall;
a lid rotatably mounted to said main body, said lid closing said opening of said main body, said lid having a peripheral wall; and
means for defining compartments for receiving the recording mediums.

DETAILED DESCRIPTION OF THE INVENTION

Referring to the drawings, a description will be made with regard to casings for accommodating recording mediums embodying the present invention.

Figure 1:
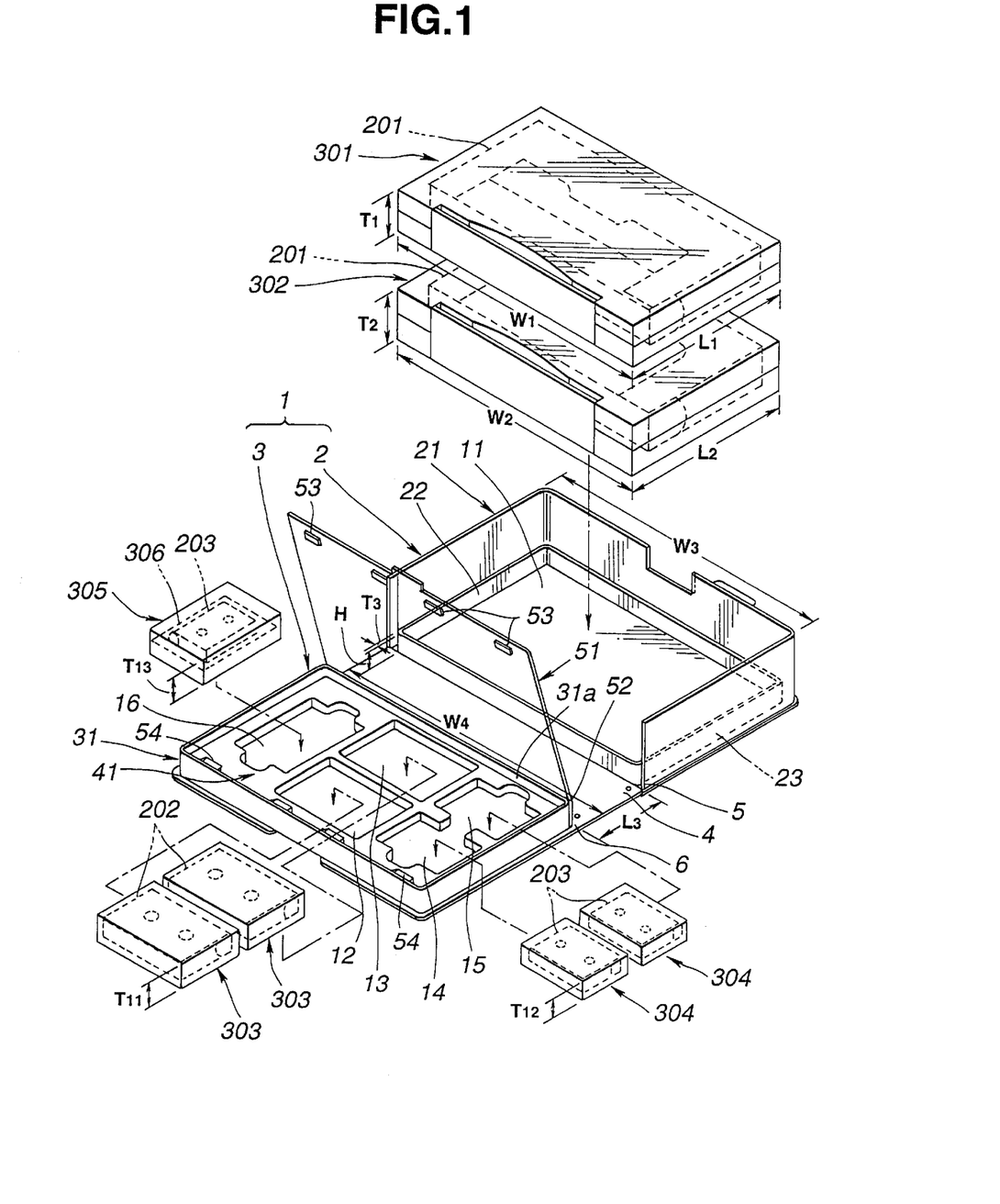
FIG. 1 is a perspective view showing a first embodiment of a casing for accommodating recording mediums according to the present invention.

FIGS. 1–5 show a first embodiment. Referring to FIG. 1, a casing 1 for accommodating recording mediums (referred hereafter to as cassette casing) comprises a main body 2 and a lid 3 rotatably mounted to the main body 2 to close an opening thereof.

The cassette casing 1 has first to sixth recording-medium or cassette compartments 11–16 having different sizes.

Figures 2A, 2B, 2C, 2D:
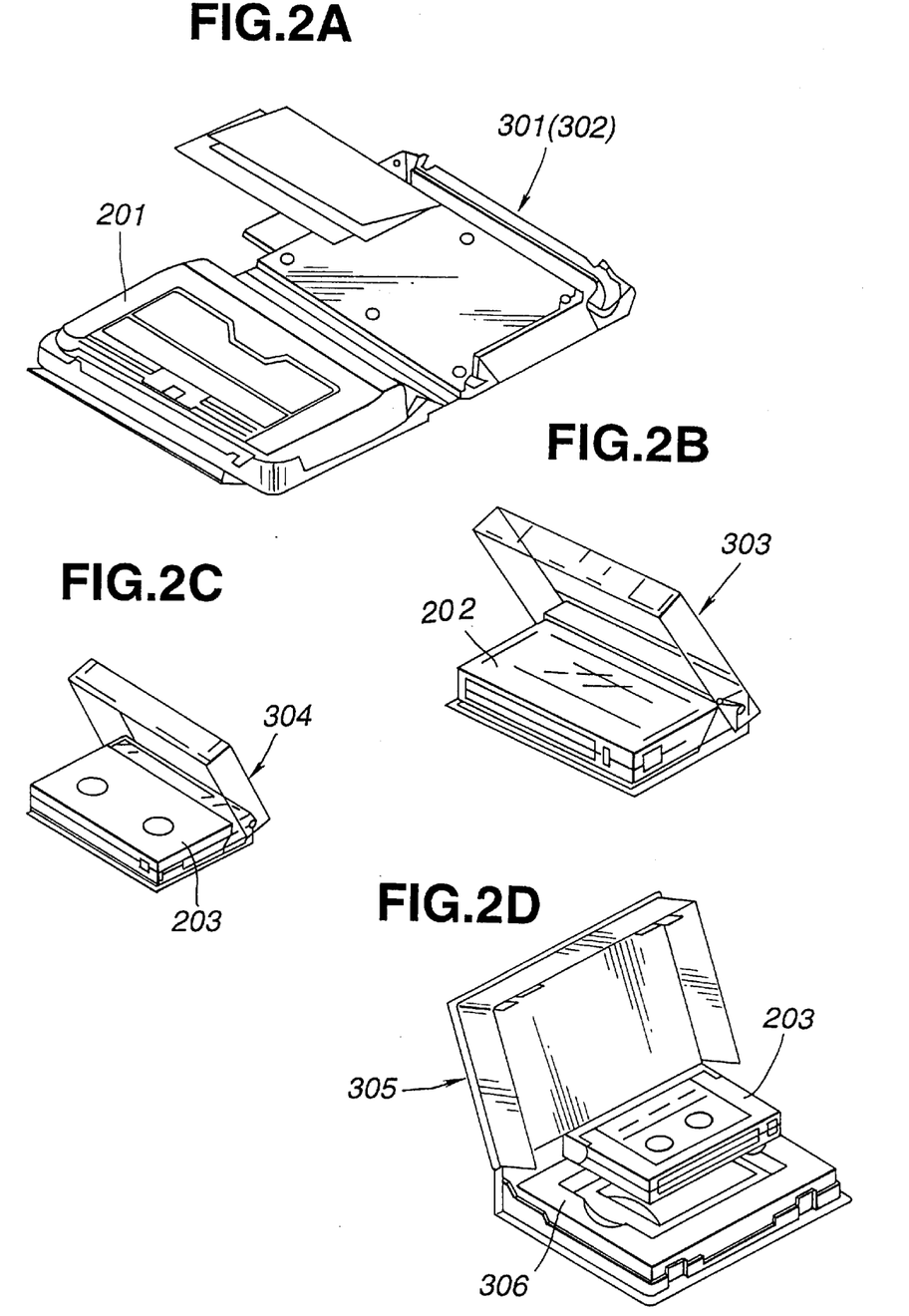
FIGS. 2A–2D are views similar to FIG. 1, showing cases.

The first cassette compartment 11 is arranged with the casing main body 2, whereas the second to sixth cassette compartments 12–16 are arranged with the lid 3. The first cassette compartment 11 is formed by arranging a substantially C-shaped peripheral wall 21 at three sides of a bottom plate of the casing main body 2. Referring to FIG. 2A, the first cassette compartment 11 serves to receive a digital videotape cassette 201 for business use accommodated in a hard case 301 or a blow case 302.

The hard case 301 is obtained by injection molding of plastics such as polyethylene and polyprophylene. The blow case 302 is obtained by blow molding of plastics.

A width $W_1$ of the hard case 301 is greater than a width $W_2$ of the blow case 302 by about 10 mm. A thickness $T_1$ of the hard case 301 is smaller than a thickness $T_2$ of the blow case 302 by about 8 mm. A length $L_1$ of the hard case 301 is equal to a length $L_2$ of the blow case 302.

The first cassette compartment 11 includes a pair of case supports 22, 23 to not only prevent clattering, but put the upper side at the same level when accommodating either of the hard case 301 and the blow case 302 having different widths and thicknesses as described above.

The case supports 22, 23 are formed with the inner surface of the peripheral wall 21, having a thickness $T_3$ of 5 mm and a height H of 8 mm. When inserting the hard case 301 into the first cassette compartment 11, the lower sides of the hard case 301 on both sides in the width direction is supported by the upper end faces of the case supports 22, 23. On the other hand, when inserting the blow case 302 into the first cassette compartment 11, the blow case 302 is fitted between the case supports 22, 23 and is supported on the bottom plate of the first cassette compartment 11.

When accommodated in the first cassette compartment 11, the hard case 301 and the blow case 302 have the upper sides positioned at the level of substantially half the height H of the peripheral wall 21.

Referring to FIG. 2B, inserted in each of the second and third cassette compartments 12, 13 is an 8 mm videotape cassette 202 accommodated in a transparent plastic case 303. Referring to FIG. 2C, inserted in each of the fourth and fifth cassette compartments 14, 15 is a digital audiotape cassette 203 accommodated in a transparent plastic case 304. Referring to FIG. 2D, inserted in the sixth cassette compartment 16 is anther digital cassette 203 accommodated in a box-type hard case 305. This digital cassette 203 is accommodated in the hard case 305 in the state positioned by an inner member 306.

The transparent plastic case 303 having the 8 mm cassette 202 therein has a thickness $T_{11}$, the transparent plastic case 304 having the digital cassette 203 therein has a thickness $T_{12}$, and the transparent plastic case 305 having the digital cassette 203 therein has a thickness $T_{13}$. The relationship between the thicknesses $T_{11}$, $T_{12}$, $T_{13}$ is given by $T_{11} > T_{13} > T_{12}$.

The cassette compartments 12–16 are obtained by forming a concavity in a recording-medium holder or spacer 41 mounted to a peripheral wall 31 of the lid 3, respectively. The height of the peripheral wall 31 of the lid 3 is substantially half the height H of the peripheral wall 21.

The recording-medium holder 41 is formed out of an expanded resin with appropriate resiliency such as expanded polyethylene, and has a plate-like shape with a predetermined thickness. The recording-medium holder 41 is mounted to the peripheral wall 31 of the lid 3 in the engaged state.

The cassette compartments 12–16 are obtained by forming in the plate-like expanded resin a concavity slightly smaller than the above cases to be inserted therein.

Figure 3:
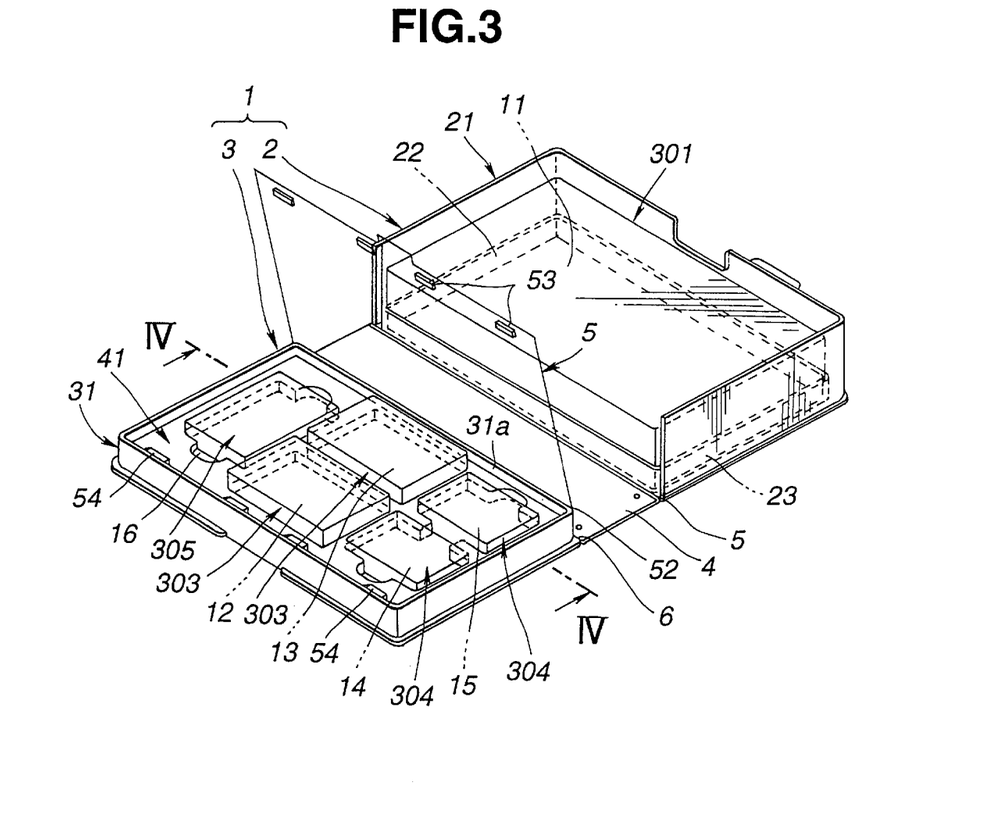
FIG. 3 is a view similar to FIG. 2D, showing the casing having the cases therein.
Figure 4:
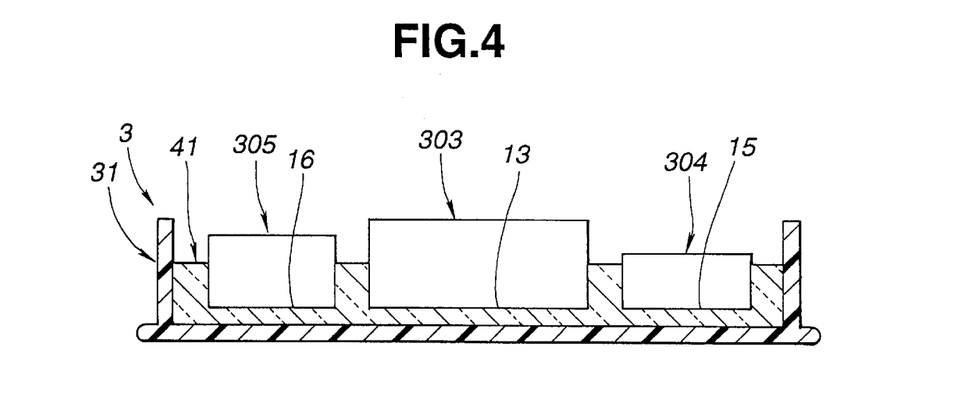
FIG. 4 is a sectional view taken along the line IV—IV in FIG. 3.

Referring to FIGS. 3–4, when pressing the transparent plastic case 303 having the 8 mm cassette 202 therein in each of the second and third cassette compartments 12, 13, the transparent plastic case 304 having the digital cassette 203 therein in each of the fourth and fifth cassette compartments 14, 15, and the box-type hard case 305 having the digital cassette 203 therein in the sixth cassette compartment 16, the upper side of the transparent plastic case 303 becomes the highest, the height of which is substantially the same as that of the peripheral wall 31.

As shown in FIG. 1, the lid 3 is mounted to one side of the casing main body 2 through a connection 4. The connection 4 has a width $W_4$ substantially equal to a width $W_3$ of the casing main body 2 and the lid 3, and a length $L_3$ substantially equal to the height H of the peripheral wall 21 of the casing main body 2. The connection 4 and the casing main boy 2 is connected by a first thin hinge 5, whereas the connection 4 and the lid 3 is connected by a second thin hinge 6. When standing the connection 4 at right angles through the first hinge 5 in the state as shown in FIG. 1, then rotating the lid 3 at right angles through the second hinge 6, the peripheral wall 31 of the lid 3 is adjacent to the inner peripheral surface of the peripheral wall 21 of the casing main body 2, and male and female engagements, not shown, arranged with the casing main body 2 and lid 3 are mashed with each other, obtaining the lid 3 locked with the casing main body 2 in the closed state.

The lid 3 includes a partition 51 for preventing the cases accommodated in the second to sixth cassette compartments 12–16 from coming off therefrom when opening the lid 3.

The partition 51 is in the form of a transparent plastic plate, and is mounted to one side face 31a of the peripheral wall 31, i.e. an outer side face thereof on the side of the second hinge 7. The partition 51 includes a thin hinge 52 along the upper end of the one side face 31a and female engagements 53 formed on the free-end side. When the partition 51 is bent substantially at right angles through the hinge 52 to be placed on the peripheral wall 31, the female engagements 53 of the partition 51 are engaged with male engagements 54 of the peripheral wall 31. The female engagements 53 and the male engagements 54 are in the form of a Velcro generally called a magic tape, a hook, etc.

Figure 5:
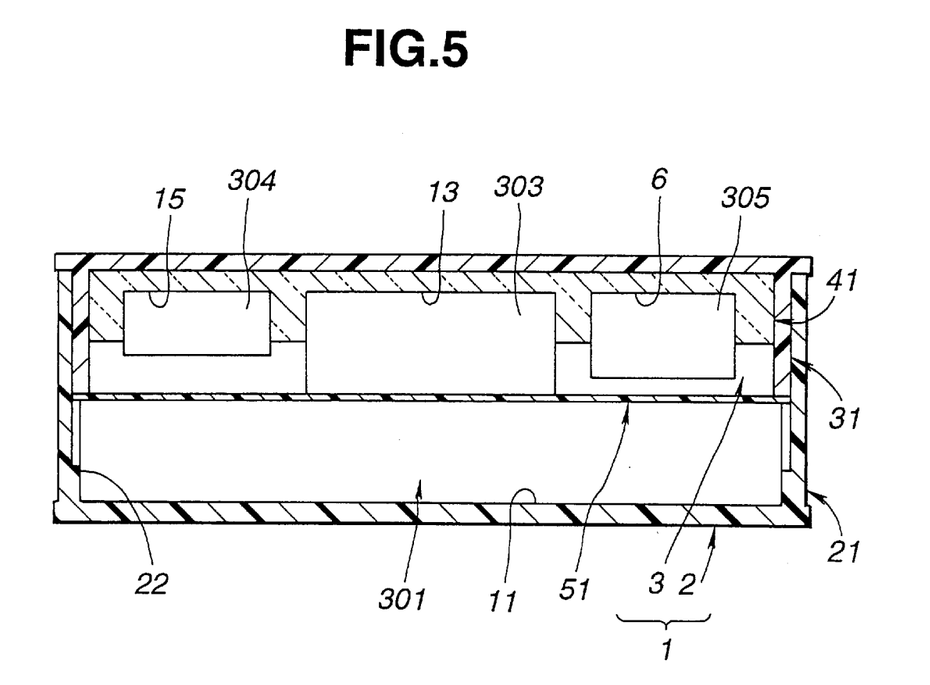
FIG. 5 is a view similar to FIG. 4, showing the casing with a lid closed.
Figure 6:
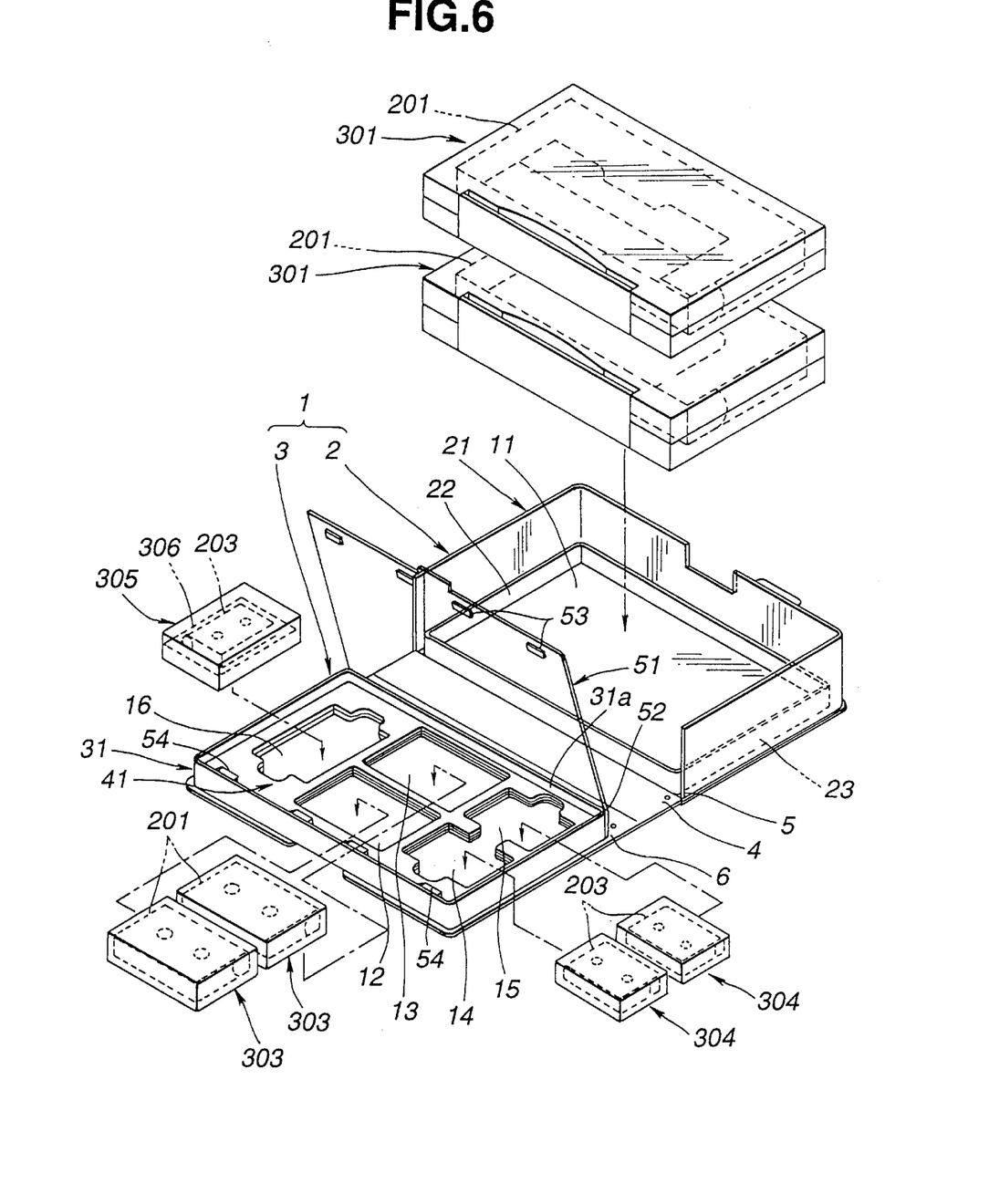
FIG. 6 is a view similar to FIG. 3, showing a second embodiment of the present invention.
Figure 7:
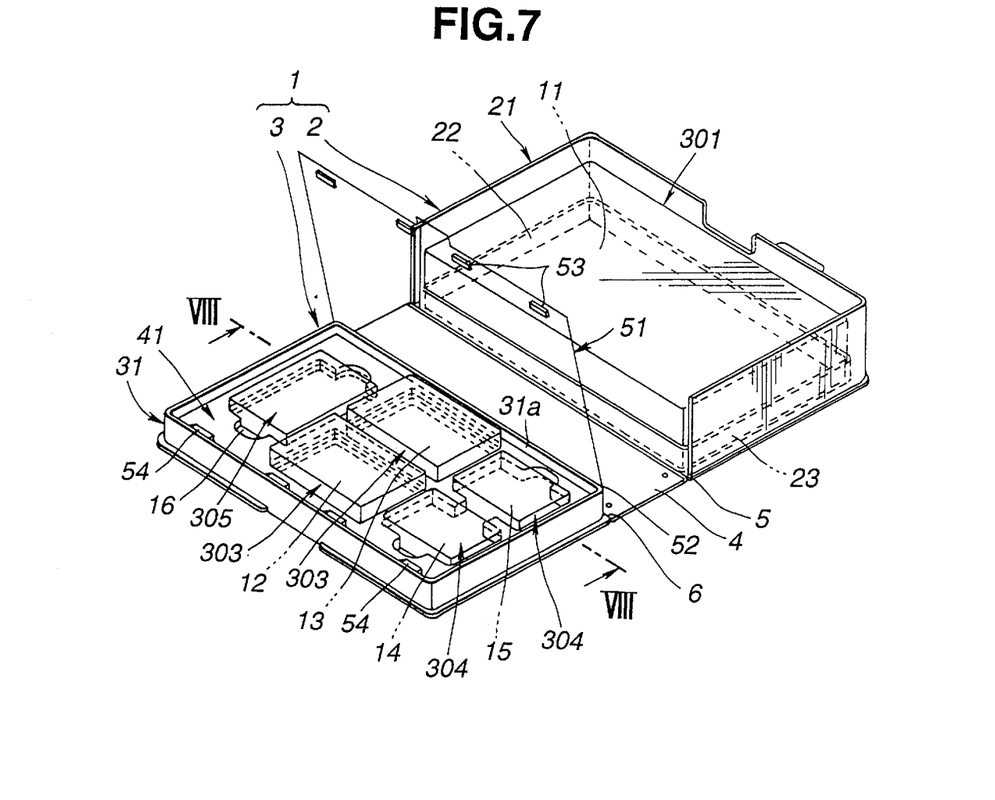
FIG. 7 is a view similar to FIG. 6, showing the casing in FIG. 6 having cases therein.

According to the first embodiment, in the state as shown in FIG. 1, the hard case 301 or the blow case 302 having the digital videotape cassette 201 therein is inserted into the first cassette compartment 11, whereas the above cases are pressed in the second to sixth cassette compartments 12–16 of the lid 3. After engagedly placing the partition 51 on the peripheral wall 31 of the lid 3, the lid 3 is rotated substantially at right angles through the first and second hinges 5, 6 to be placed on the casing main body 2, obtaining its locking in the closed state as shown in FIG. 5.

FIGS. 6–9 show a second embodiment of the present invention which is substantially the same as the first embodiment except that the second and third cassette compartments 12, 13, the fourth and fifth cassette compartments 14, 15, and the sixth cassette compartment 16 have different depths so that the levels of the upper sides of the cases are equal to each other when accommodating therein the above cases.

Figure 8:
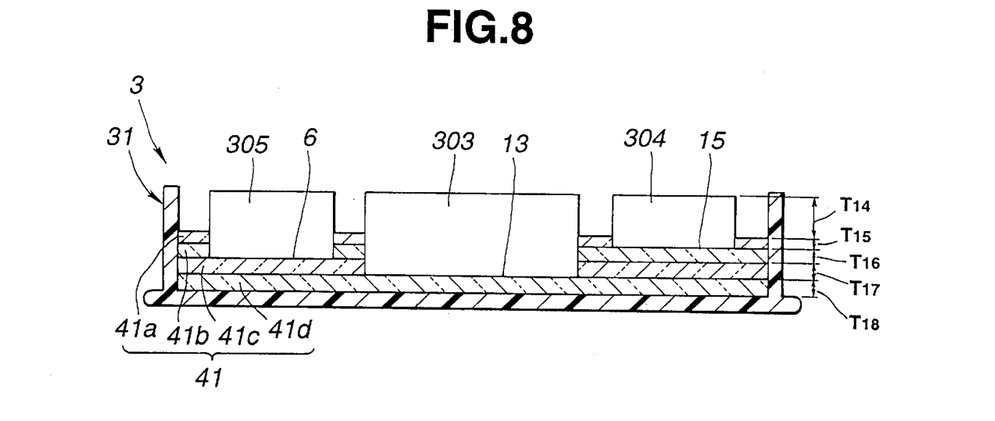
FIG. 8 is a view similar to FIG. 5, taken along the line VIII—VIII in FIG. 7.

As best seen in FIG. 8. the recording-medium holder or spacer 41 formed with the second to sixth cassette compartments 12–16 is obtained by placing four expanded-resin sheets 41a–41d.

Suppose, as described above, that the thickness of the transparent plastic case 303 having the 8 mm cassette 202 therein is $T_{11}$, the thickness of the transparent plastic case 304 having the digital cassette 203 therein is $T_{12}$, and the thickness of the transparent plastic case 305 having the digital cassette 203 therein is $T_{13}$. Suppose also that the protrusion amount of the cases 303–305 with respect to the upper side of the recording-medium holder 41 is $T_{14}$. Referring to FIG. 8, a thickness $T_{15}$ of the first or uppermost expanded-resin sheet 41a is determined to be $T_{12}-T_{14}$, a thickness $T_{16}$ of the second expanded-resin sheet 41b is determined to be $T_{13}-T_{12}$, a thickness $T_{17}$ of the third expanded-resin sheet 41c is determined to be $T_{11}-T_{13}$, and a thickness $T_{18}$ of the fourth expanded-resin sheet 41d is determined to be free. It is noted that the thickness $T_{18}$ of the fourth expanded-resin sheet 41d is, preferably, substantially equal to a value obtained by subtracting $T_{11}$ from half of the height H of the peripheral wall 21 of the casing main body 2, i.e. $T_{18} \approx \frac{1}{2}H - T_{11}$. This preference is determined so that when accommodating the cases in the casing main body 2 and the lid 3, and placing the lid 3 on the casing main body 2, the cases are within the range of the height H of the peripheral wall 21 of the casing main body 2.

The first to third expanded-resin sheets 41a–41c are punched to obtain the second and third cassette compartments 12, 13, the first and second expanded-resin sheets 41a, 41b are punched to obtain the sixth cassette compartment 16, and only the first expanded-resin sheet 41a is punched to obtain the fourth and fifth cassette compartments 14, 15.

Generally, when the number of cases having different thicknesses is n, the relationship between the thicknesses of the cases is given by Tn<Tn–1<Tn–2 . . . <Tn–(n–1), and the protrusion amount of the cases with respect to the upper side of the recording-medium holder 41 is Tz, the thicknesses of the expanded-resin sheets or layers are given as follows:

| | |
|---|---|
| Thickness of the first layer | Tn-Tz |
| Thickness of the second layer | (Tn-1)-Tn |
| Thickness of the third layer | (Tn-2)-(Tn-1) |
| . | |
| . | |
| . | |
| Thickness of the nth layer | (Tn -(n-1))-(Tn-(n-2)) |
| Thickness of the (n + 1)th layer | free |

Figure 9:
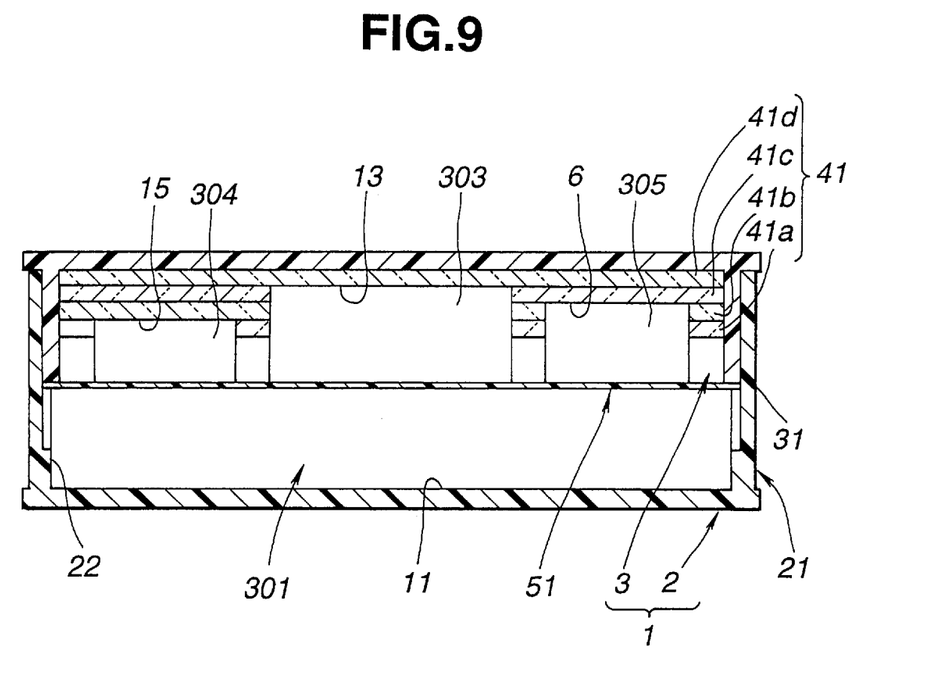
FIG. 9 is a view similar to FIG. 8, showing the casing with the lid closed.

According to the second embodiment, the heights of the cases 303–305 accommodated in the second to sixth cassette compartments 12–16 are equal to each other, obtaining excellent stability when closing the lid 3 as shown in FIG. 9.

Figure 10:
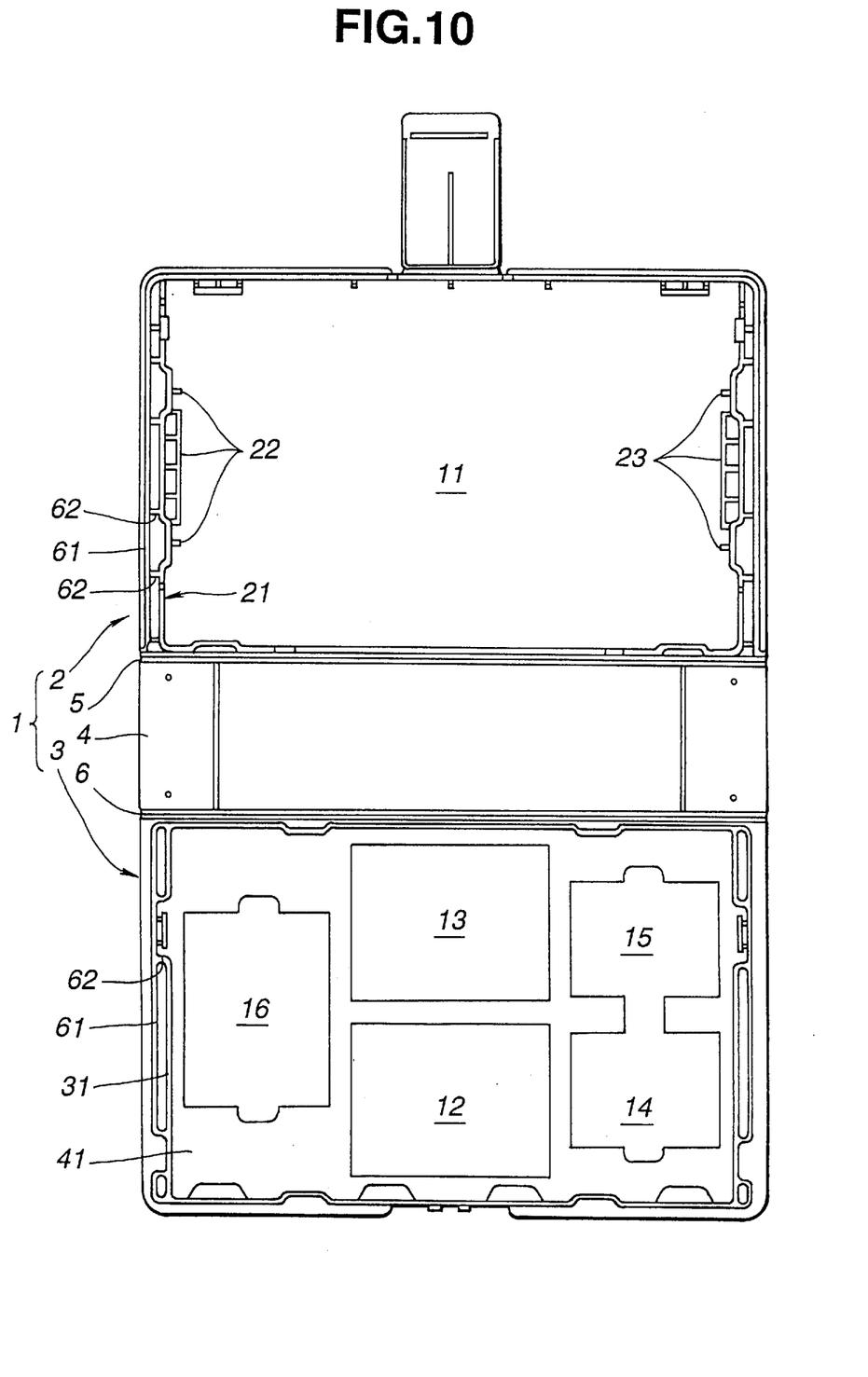
FIG. 10 is a plan view showing a third embodiment of the present invention.

FIG. 10 shows a third embodiment of the present invention which is substantially the same as the above embodiments except that a reinforcing wall 61 is arranged to reinforce each of the peripheral wall 21 of the casing main body 21 and the peripheral wall 31 of the lid 3.

The reinforcing walls 61 are arranged with the rectangular peripheral walls 21, 31 at the opposite short sides. The peripheral walls 21, 31 and the reinforcing wall 61 are connected through external-force dispersing ribs 62.

According to the third embodiment, even when the cassette casing 1 having in the casing main body 2 the hard case 301 or blow case 302 which accommodates the digital videotape cassette 201 is dropped on the floor, etc. from the short side so that a potential energy or impact force of the hard case 301 or the blow case 302 having the digital videotape cassette 201 therein acts on the peripheral wall 21 of the casing main body 2, this impact force is dispersed by the ribs 62, avoiding a breakage of the peripheral wall 21 of the casing main body 2.

Having described the present invention with regard to the preferred embodiments, it is noted that the present invention is not limited thereto, and various changes and modifications can be made without departing from the scope of the present invention.

By way of example, in the above embodiments, the digital videotape cassette 201 and the digital cassette accommodated in the cases are received in the first to sixth cassette compartments 12–16, alternatively, they may be received therein without being accommodated in the cases. Moreover, the recording medium may be a disc cartridge.

What is claimed is:

1. A casing for accommodating recording mediums with different sizes and thicknesses, comprising:
   a main body formed with an opening, said main body having a first hollow peripheral wall forming a main compartment for receiving at least one recording medium; and
   a lid rotatably mounted to said main body, said lid closing and opening of said main body, said lid having
   a second hollow peripheral wall;
   a plurality of compartments for receiving the recording mediums formed within the second hollow peripheral wall; and
   a partition including means securing the partition to the lid for preventing the recording mediums received in said plurality of compartments on said lid from falling out of said compartments when said lid is in operation.

2. A casing as claimed in claim 1, wherein each of said plurality of compartments arranged on said lid is in the form of a concavity formed in a holder mounted to said second hollow peripheral wall of said lid.

3. A casing as claimed in claim 2, wherein each of said plurality of compartments has different depths so that the heights of upper sides of the recording mediums are equal to each other when received therein.

4. A casing as claimed in claim 3, wherein said holder is formed by placing a plurality of sheets on top of each other, each sheet having a different size concavity formed therein so as to form said plurality of compartments having different depths.

5. A casing as claimed in claim 4, wherein each of said sheets are formed out of an expanded resin with resiliency.

6. A casing as claimed in claim 2, wherein said holder is formed out of an expanded resin with resiliency.

7. A casing as claimed in claim 1, wherein at least one of said peripheral walls of said main body and lid is reinforced by a reinforcing wall.

8. A casing as claimed in claim 7, wherein said at least one of said peripheral walls and said reinforcing wall is connected through a rib.

9. A casing as claimed in claim 1, wherein said main compartment includes a case support fitted along an inner periphery of said first hollow peripheral wall so as to form an upper section and a lower section.

10. A casing as claimed in claim 9, wherein said upper section has a larger area than said lower section such that said lower section accommodates a smaller sized recording medium than the upper section.

11. A casing as claimed in claim 9, wherein said case support is formed by a hollow frame.

12. A casing as claimed in claim 9, wherein said case supporting is formed by a plurality of ribs formed on opposing sides of said first hollow peripheral wall.

13. A casing as claimed in claim 1, wherein said first hollow peripheral wall is generally C-shaped.

14. A casing as claimed in claim 1, wherein said second hollow peripheral wall and said partition includes fasteners arranged thereon, whereby said partition forms a cover for said plurality of compartments when said fasteners are engaged.

15. A casing as claimed in claim 14, wherein said fasteners are a hook-type fastener.

* * * * *

UNITED STATES PATENT AND TRADEMARK OFFICE
CERTIFICATE OF CORRECTION

PATENT NO. : 5,915,548
DATED : June 29, 1999
INVENTOR(S) : Jun SASAKI

It is certified that error appears in the above-identified patent and that said Letters Patent is hereby corrected as shown below:

The title, item [54] and Column 1, line 1, etc., should read

-- CASINGS FOR ACCOMMODATING RECORDING MEDIUMS --.

Signed and Sealed this

Twenty-second Day of May, 2001

Attest:

NICHOLAS P. GODICI

Attesting Officer     Acting Director of the United States Patent and Trademark Office